United States Patent

Svenstam

[11] 3,993,122
[45] Nov. 23, 1976

[54] STEPS, STAIRS AND THE LIKE
[75] Inventor: Sven Gunnar Svenstam, Upplands Vasby, Sweden
[73] Assignee: Granges Essem Aktiebolag, Vasteras, Sweden
[22] Filed: Sept. 24, 1975
[21] Appl. No.: 616,397

Related U.S. Application Data
[63] Continuation-in-part of Ser. Nos. 284,456, Aug. 28, 1972, Pat. No. 3,881,235, and Ser. No. 462,538, April 19, 1974, abandoned.

[30] Foreign Application Priority Data
Aug. 27, 1971 Sweden.............................. 10908/71

[52] U.S. Cl................................... 165/45; 165/47; 126/271.2 A; 52/173 R; 52/189
[51] Int. Cl.².................... F24H 3/00; E04F 11/14
[58] Field of Search............. 165/45, 47; 126/271.1, 126/271.2 R, 271.2 A, 271.2 B, 271.2 C, 271.3; 52/182, 189, 220, 173; 404/71

[56] References Cited
UNITED STATES PATENTS

| 867,818 | 10/1907 | Graham | 52/182 |
| 1,771,268 | 7/1930 | Musgrave | 404/71 |
| 1,771,269 | 7/1930 | Musgrave et al. | 404/71 |
| 2,997,770 | 8/1961 | Beltz | 52/220 |
| 3,157,358 | 11/1964 | Birkemeier | 237/1 |

FOREIGN PATENTS OR APPLICATIONS

| 236,086 | 10/1964 | Austria | 52/189 |
| 535,480 | 2/1955 | Belgium | 52/220 |
| 481,691 | 3/1952 | Canada | 165/45 |
| 702,077 | 1/1965 | Canada | 404/71 |
| 172,886 | 9/1960 | Sweden | 52/182 |

Primary Examiner—Martin P. Schwadron
Assistant Examiner—Abraham Hershkovitz
Attorney, Agent, or Firm—Haseltine, Lake & Waters

[57] ABSTRACT

A flight of steps, stairs and the like heated by means of a heating medium passing through a pipe means located within the steps, stairs etc. The pipe means is located totally within the confines of the step structure and extends in a tortuous path generally longitudinally of the flight of steps. The pipe is permanently pre-shaped so as to present interconnected, generally arcuate looped portions and is made to conform to the step configuration substantially solely by being twisted at selected regions along its length.

6 Claims, 6 Drawing Figures

STEPS, STAIRS AND THE LIKE

The present application is a continuation-in-part of the parent applications Ser. Nos. 284,456, filed Aug. 28, 1972 (now U.S. Pat. No. 3,881,235) and Ser. No. 462,538, filed Apr. 19, 1974, now abandoned.

BACKGROUND OF THE INVENTION

The present invention relates to a flight of steps, stairs and the like of the type with which at least one pipe, suitably made of a plastics material, is mounted beneath the treads of the flight of steps or stairs and arranged to conduct a heat transmitting medium to maintain the steps or stairs free from ice and snow.

When constructing steps or stairs of the aforementioned type, the pipe through which the heating medium is conducted is normally delivered to the working site in the form of pipe which has been wound in a straight and cold condition onto drums or the like of relatively large diameter, and hence from the point of view of laying the pipe, is equivalent to straight pipe. Because of the relative inflexibility of the pipe, it is normally necessary to place it on the structural members of the steps, e.g. the step reinforcing frame structure, in such a manner that portions of the pipe in the finished flight of steps extend traversely of the steps beneath the treads, while other portions of the pipe connecting together the transversely extending pipe portions are located outside the steps in the form of wide connecting loops. The connecting loops must be placed externally of the steps on either side thereof and fulfill no useful purpose other than that of connecting together the transversely extending pipe portions. This method of construction often results in high building costs and excessively bulky step or stair structures.

With another method of constructing steps or stairs of the aforementioned type, the system of pipes for conducting the heating medium is constructed of straight lengths of pipe placed transversely and longitudinally of the flight of steps and connected together by means of pipe couplings or the like. Although this method of construction enables the steps or stairs to be kept within reasonable dimensions, the costs involved are high and the flow conditions for the heating medium unfavorable, while at the same time there is a serious danger of leaks occurring.

It is an object of the present invention to overcome the above disadvantages.

In accordance with the present invention, there is provided a flight of steps, stairs and the like having pipe means arranged to conduct heating medium to maintain the steps free from ice and snow, said pipe means being permanently pre-shaped to present interconnected substantially arcuate portions and extending substantially in the longitudinal direction of the flight of steps in a tortuous path such as to present substantially arcuate interconnected looped portions located within the confines of the flight of steps and curving alternately towards either side of the flight of steps, said pipe means being arranged beneath the treads and risers of the steps in planes extending substantially parallel with said treads and risers, said pipe means extending substantially perpendicular to the longitudinal direction of said flight of steps at the junctions between treads and risers.

The invention will now be described in more detail with reference to an embodiment thereof illustrated in the accompanying drawing, further advantages and features of the invention being made apparent in connection therewith.

DESCRIPTION OF THE PREFERRED EMBODIMENTS

Figure 1:
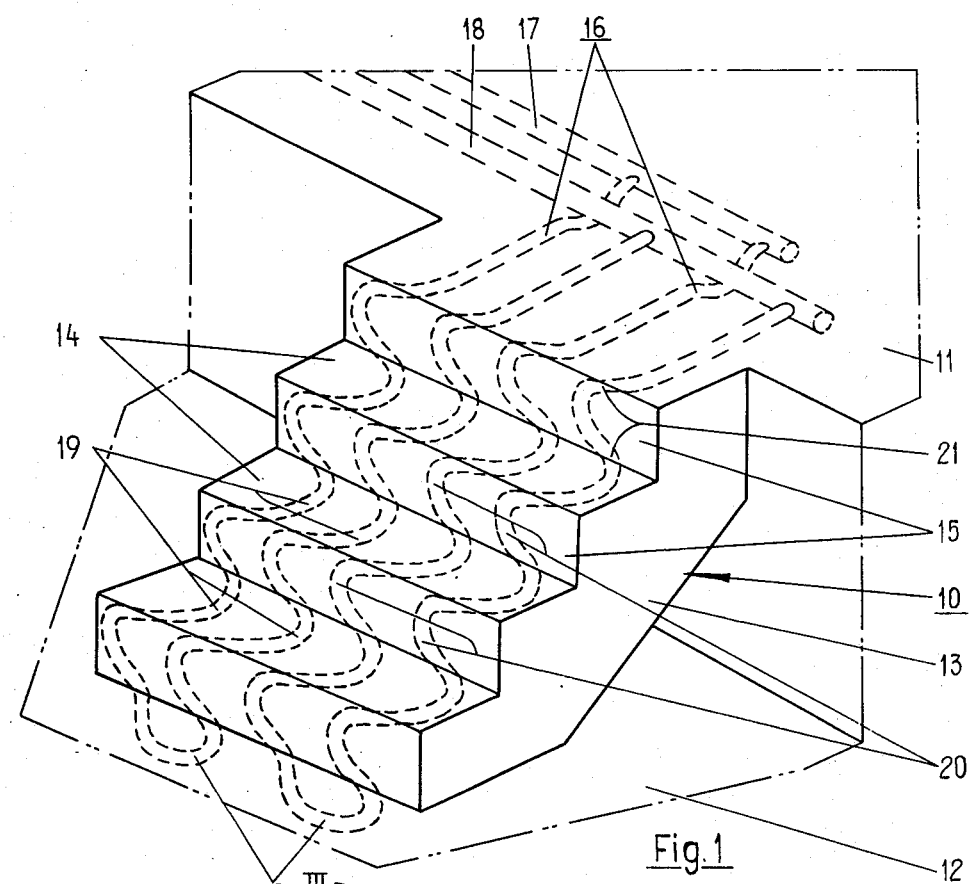
FIG. 1 is a perspective view of a flight of steps constructed in accordance with the invention.

In the drawing like elements have been identified by like reference numerals, and the reference numeral 10 indicates generally a flight of steps or stairs extending between an upper platform level 11 and a lower platform level 12. The visible side of the steps is shown at 13. Embodied in the steps 10, the treads are risers of which are shown at 14 and 15 respectively, are plastic pipes 16 through which is arranged to pass a heating medium for the purpose of maintaining the steps free from ice and snow. The heating medium is suitably in the form of hot water, which may previously have been used for heating houses, apartment buildings or the like.

One end of each pipe 16 is connected to an inlet 17 and the other end to an outlet 18 for heating medium. The pipes 16 extend generally in the longitudinal direction of the flight of steps 10 in such a tortuous path as to present within the confines of the steps substantially U-shaped interconnected looped portions 19, 20 which extend alternately towards either side of the steps. Each of the looped portions 19, 20 is located in a plane which lies generally parallel with the surface of its respective riser or tread, the looped portions located beneath the tread surfaces 14 being identified by the reference numeral 19 and the looped portions located inwardly of the riser surface 15 with the reference numeral 20. The pipes 16 extend substantially perpendicular to the longitudinal direction of the flight of steps 10 at the junctions 21 between the treads and risers. The pipes 16 are preshaped in a manner such that they present interconnected, substantially arcuate portions of such shape and size as to render it unnecessary to bend or straighten the arcuate portions, or at least to more than a slight extent, in order to form the looped portions 19, 20 when mounting the pipes 16 on the building framework (not shown) of the steps. This framework may comprise, for example, a reinforcing frame structure for the steps or a stairlike body, on which the pipes are mounted and then embedded in the material forming the outer layer of the tread and riser. The permanent shapes of the pipes 16 can readily be imparted thereto in manufacture, by shaping the pipes while hot and cooling them in the shaped condition. Shaping of the pipes can be effected at the pipe-making factory, in connection with the pipe extrusion process applied to produce the pipes. Alternately, it is often more suitable to shape ready manufactured pipes, for example by passing hot water through the pipes so that the pipes can be bent to the desired shape, and then permanently fixing the shape by passing a cooling medium such as cold water through the pipes.

According to the invention, pipes can be used which have been permanently pre-shaped in a manner such that the pipes follow a substantially sinus-shaped path or a path of similar tortuous configuration so that the pipes need generally only to be twisted through about 90° around their axis in certain regions along the length thereof in order to be made to conform in the desired manner to the step structure. Pipes in this form are less suitable, however, from the point of view of general handling and transportation of the pipes. A more advantageous pipe form is described hereinafter with reference to FIGS. 4–6.

As will be seen from FIG. 1, the pipes 16 extend parallel to one another, wherewith each tread and riser of the steps will be heated substantially uniformly across the whole of its surface by the heating medium flowing through the pipes. Each pipe 16 passes backwards and forwards once between the top 11 and the foot 12 of the steps 10, although it will be readily perceived that each pipe 16 can form more than two pipe sections extending between the stair-foot and the stair-head. In this connection, it is suitable that the inlet 17 and the outlet 18 are located in the illustrated manner at the same end of the flight of steps, whereby the heat from the heating medium flowing through the pipes is distrubuted generally uniformly over the whole flight of steps 10. The inlet 17 and outlet 18 arranged at the top platform surface 11 of the steps are joined to the pipes 16 by welding joints or pipe couplings (not shown), the pipe sections of each pipe 16 extending backwards and forwards between the foot and the head of the steps are located parallel with each other and are joined together at the lower end of the steps by means of a looped portion 22 formed by a portion of the pipe 16 and arranged beneath the bottom platform surface 12 of the steps.

Figure 2:
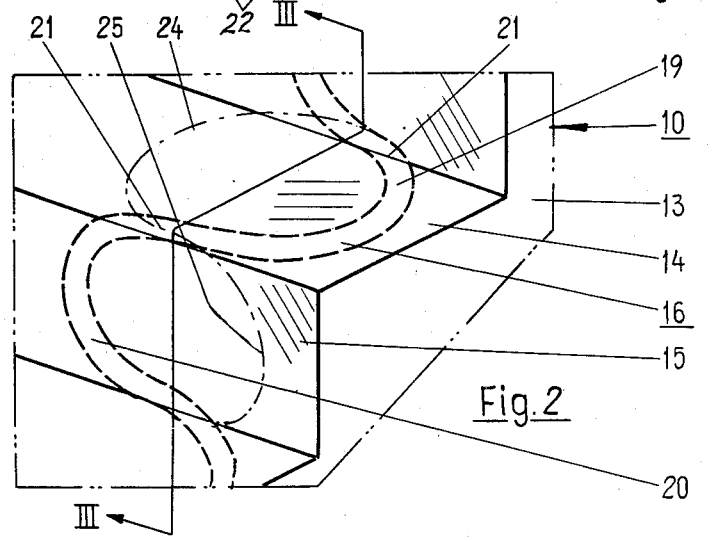
FIG. 2 illustrates in larger scale a portion of the steps shown in FIG. 1.
Figure 3:
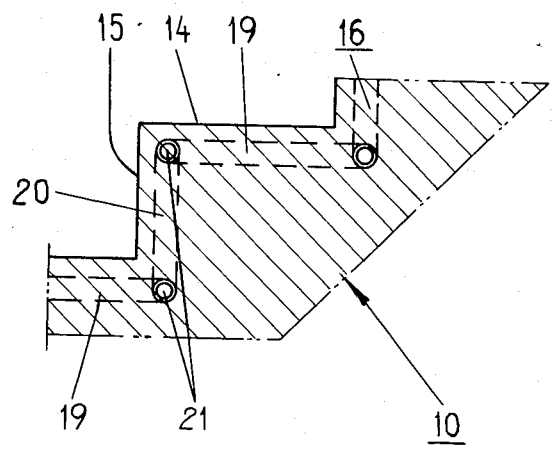
FIG. 3 is a sectional view taken through line III—III in FIG. 2.
Figure 4:
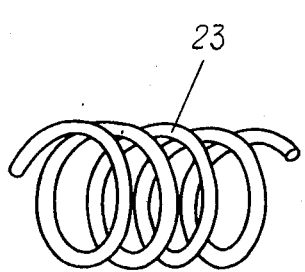
FIGS. 4–6 illustrate in perspective three forms to which the pipes laid in the steps can be permanently pre-shaped before being embodied in the steps.

In FIG. 4 there is illustrated a helically wound, permanently shaped pipe 23, which is a suitable form from the aspect of transportation and handling of the pipe and which can be used to advantage with a flight of steps or stairs constructed in accordance with FIGS. 1–3. It will readily be understood that looped portions similar to those at 19 and 20 can readily be obtained by twisting the pipe 23 through roughly 90° about its long axis at regions along the helically coiled pipe spaced about 180° apart. This is also evident from FIG. 2, from which it can be seen that a turn of a helix would be obtained by turning the uppermost loop portion 20 through 90° to the upper tread, as shown by the chain line 24, and that another turn of a helix would be obtained if the lowermost loop portion 19 were also turned through 90° to the lower tread, as shown by the chain line 25. If the depth of the tread exceeds the height of the riser to compensate for the difference the arcuate pipe portions forming the looped portions in the tread can be straightened out slightly and/or the arcuate pipe portions forming the looped portions in the risers may be more tightly bent, and/or a larger portion of each turn of the helically wound pipe may be used to form the looped portions in the treads and a smaller portion of each turn may be used to form the looped portions in the riser. When mounting the pipe 23 on the step frame structure, it is also possible to straighten or to bend the pipe somewhat, in a manner to obtain in the finished flight of steps generally semi-circular arcuate looped portions 19, 20 respectively of greater and smaller radius than the radius of the coils of the helically wound pipe 23. Suitably, however, the dimensions of the turns of the helically wound pipe 23 are selected so that the length of a turn is substantially equal to the total length of the looped portions 19, 20 in a tread 14 and adjacent riser 15 of the finished steps.

Figure 5:
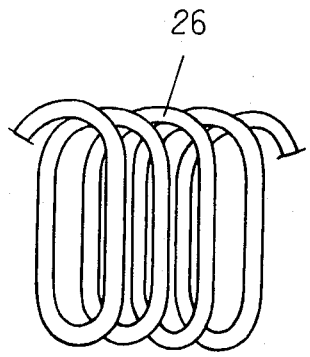

The permanently shaped pipe 26 illustrated in FIG. 5 differs from pipe 23 inasmuch as the turns of the pipe 26 are oval and not circular. when using the pipe 26, generally arcuate looped portions which correspond to the looped portions 19, 20 but which extend to a greater or lesser extent in the transverse direction of the steps can be obtained by twisting the pipe through 90° around its long axis, at selected regions spaced approximately 180° apart.

Figure 6:
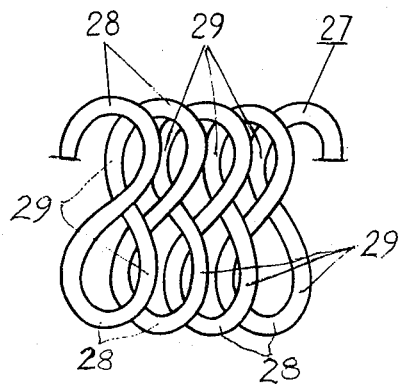

FIG. 6 illustrates a pipe 27 which has been permanently shaped to the form of sequentially arranged loops of roughly figure-eight configuration and which can be used with the present invention. When mounting the pipe to the frame structure of the steps, the pipe can be turned through 90° about its long axis at regions 28 to obtain in each tread and riser two looped portions, each of which extends towards its respective side of the steps. Alternatively, the pipe 27 can be twisted at regions 29, wherewith the portions of the pipe forming three-quarters of the 8-shaped loops are placed beneath the treads 14 and the slightly S-shaped portions of the pipe therebetween are placed behind the risers 15.

The invention is not restricted to the described and illustrated embodiment, but can be modified within the scope of the following claims.

I claim:

1. A flight of steps, stairs and the like having pipe means arranged to conduct heating medium to maintain the steps free from ice and snow, said pipe means being permanently preshaped to present interconnected substantially arcuate portions and extending substantially in the longitudinal direction of the flight of steps in a tortuous path such as to present substantially arcuate interconnected looped portions located within the confines of the flight of steps and curving alternately towards either side of the flight of steps, said pipe means being arranged beneath the treads and risers of the steps in planes extending substantially parallel with said treads and risers, said pipe means extending substantially perpendicular to the longitudinal direction of said flight of steps at the junctions between treads and risers.

2. The steps of claim 1, wherein said pipe means comprises a number of pipes extending in a tortuous path substantially in the longitudinally direction of the flight of steps, said pipes extending generally parallel with each other along the flight of steps.

3. The steps of claim 1, wherein said pipe means comprises a number of pipe portions extending in a tortuous path substantially in the longitudinal direction of the flight of steps between the top and the bottom thereof.

4. The steps of claim 3, wherein the ends of said pipe means are connected at one end and the same end of the flight of steps to a heating medium inlet and a heating medium outlet.

5. The steps of claim 3, wherein said pipe portions extend substantially parallel with each other along the flight of steps.

6. The steps of claim 1, wherein said pipe means extends between two adjacent treads and two adjacent risers respectively in the form of one single, substantially U-shaped looped portion.

* * * * *